T. W. MURRAY.
Car Brake.

No. 68,452.

Patented Sept. 3, 1867.

Witnesses

Inventor
Thos. W. Murray

United States Patent Office.

THOMAS W. MURRAY, OF NEW YORK, N. Y.

Letters Patent No. 68,452, dated September 3, 1867.

---

IMPROVEMENT IN CAR-BRAKE AND STARTING APPARATUS.

---

*The Schedule referred to in these Letters Patent and making part of the same.*

---

TO WHOM IT MAY CONCERN:

Be it known that I, THOMAS W. MURRAY, of the city, county, and State of New York, have invented a new and useful Machine to be Applied to Railway Cars, by which the power of a train in motion can be used to stop it, at the control of the engineer thereof, and without the assistance of brakesmen; and I hereby declare that the following is a full, clear, and exact description of the same, reference being had to the annexed drawings, making part of this specification, and marked figs. 1, 2, and 3.

Figure 1:
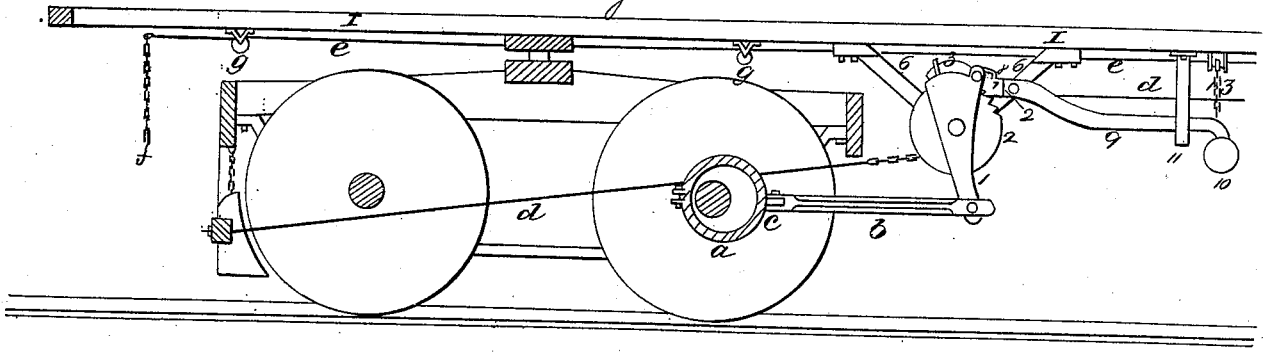

Figure 1 is a side view showing one truck of a car, to an axle of which is secured the eccentric wheel $a$, with the rod $b$ jointed at $c$, to provide against the bending of the rod $b$ when the truck is out of the usual line in turning curves. The rod $b$ works the lever 1, on the top of which the pawl 3 is pivoted, the latter working in the teeth of the ratchet-wheel 2, which wheel is firmly attached to the shaft 5.

Figure 2:
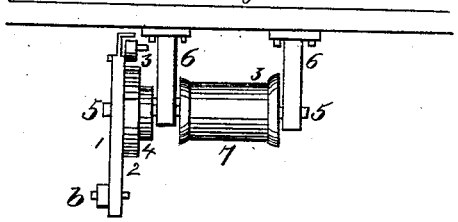
Figure 3:
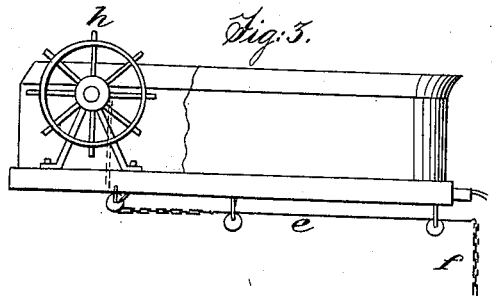

Figure 2 is an end view, minus the lever 9 and the pawl 8, for better showing the construction of the balance. No. 4 is another ratchet-wheel, of smaller diameter than No. 2, but having corresponding teeth, and is also firmly attached to the shaft 5. Working in the teeth of wheel 4 is the pawl 8, (fig. 1,) which is by a knuckle-joint, 12, controlled by the lever 9. On the end of the latter is the weight 10. The lever 9 is held in position by a pivot firmly attached to the hanger 6, and the weight 10 is kept from swaying or dropping too far by the support 11. The hangers 6 are firmly bolted to the floor of the car I, holding the shaft 5 in position. To the latter is firmly attached the barrel 7, having the chains of the brake-rods $d$ securely fastened thereto. Beneath the floor of the car I runs the rod $e$, kept in position by pulleys. On each end of the rod $e$ chains $f$ are attached, which are hooked together when the train is made up, and *vice versa;* the chain $f$ on the first car of the train to be hooked to the chain $f$ (Figure 3) on the tender of the locomotive, and is controlled by the wheel $h$, fig. 3, under the direction of the engineer.

The *modus operandi* of the machine is as follows: A train of cars having all the chains $f$ hooked together is ready for a start. When the engineer desires to stop, at a sign from him the fireman, by a turn of the wheel $h$, raises the weights 10, when instantly the pawl 3 drops, taking hold of and turning the wheels and shaft of the machine, the pawl 8 holding what has been taken up by the pawl 3 on the brake-rods, while the latter is going back to take another hold on the teeth of the wheel 2 after bringing the brakes close to the car-wheels. The pawl 8 works on the plain circumference of the wheel 4, holding so much, but not taking up any more, but the pawl 3 continues working on the wheel 2, pinching the brakes to the car-wheels at every revolution of the eccentric, but never stopping the car-wheels entirely so as to cause them to slide on the track, and thereby create what is now so common, viz, flat wheels. This pinching of the brakes continues during the motion of the car, or during the will of the engineer. When it becomes desirable to let off the brakes the wheel $h$ is released, when the weights 10 instantly drop, the pawl 8 striking the pin on pawl 3 an upward blow, thereby carrying the whole combination out of gear, the brakes leaving the car-wheels, and the machine is ready for another stop.

What I claim as my invention, and desire to secure by Letters Patent, is—

1. The partial ratchet-wheels 2 and 4, pawls 3 and 8, weighted lever 9, and lever 1, all constructed and combined as described, and for the purpose set forth.

2. In combination with the above I claim the arm 6 and cam fixed on the wheel, as and for the purpose set forth.

THOMAS W. MURRAY.

Witnesses:
JOHN MURPHY,
WM. H. BROWER.